United States Patent
Koo et al.

(10) Patent No.: US 8,019,146 B2
(45) Date of Patent: Sep. 13, 2011

(54) METHOD FOR ADJUSTING DISPARITY IN THREE-DIMENSIONAL IMAGE AND THREE-DIMENSIONAL IMAGING DEVICE THEREOF

(75) Inventors: Jae-phil Koo, Seoul (KR); Tae-hyeun Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 944 days.

(21) Appl. No.: 11/853,166

(22) Filed: Sep. 11, 2007

(65) Prior Publication Data

US 2008/0112616 A1 May 15, 2008

(30) Foreign Application Priority Data

Nov. 14, 2006 (KR) .................. 10-2006-0112298

(51) Int. Cl.
*G06K 9/00* (2006.01)
*G06T 15/00* (2011.01)

(52) U.S. Cl. ...................................... 382/154

(58) Field of Classification Search .............. 382/145; 356/12–14; 359/462–477; 345/419
See application file for complete search history.

(56) References Cited

U.S. PATENT DOCUMENTS

| 5,937,079 | A | * | 8/1999 | Franke | 382/103 |
| 6,125,198 | A | * | 9/2000 | Onda | 382/154 |
| 6,606,406 | B1 | * | 8/2003 | Zhang et al. | 382/154 |
| 7,623,674 | B2 | * | 11/2009 | Nichani et al. | 382/103 |
| 2005/0089212 | A1 | * | 4/2005 | Mashitani et al. | 382/154 |
| 2006/0210146 | A1 | * | 9/2006 | Gu | 382/154 |
| 2006/0215903 | A1 | * | 9/2006 | Nishiyama | 382/154 |
| 2007/0081716 | A1 | * | 4/2007 | Ha et al. | 382/154 |
| 2009/0040295 | A1 | * | 2/2009 | Koo et al. | 348/42 |

OTHER PUBLICATIONS

Kim et al. "Face Detection using Multi-modal Information." Fourth IEEE International Conference on Automatic Face and Gesture Recognition, Mar. 28, 2000, 6 pages.*

* cited by examiner

*Primary Examiner* — Jon Chang

(74) *Attorney, Agent, or Firm* — Sughrue Mion, PLLC

(57) ABSTRACT

A method and apparatus for adjusting disparity in a 3D image and a 3D imaging device thereof are provided. The apparatus includes a disparity estimator which estimates disparity in an input 3D image and determines a disparity histogram pixel-wise; a disparity adjustor which analyzes energy of a parallax range of the disparity histogram and determines a disparity adjustment amount; and a 3D image reproducer which reproduces the 3D image based on the disparity adjustment amount. Accordingly, the disparity adjustment amount is determined by analyzing disparity energy of the disparity histogram, so a viewer may feel visual comfort and an optimal stereoscopic effect may be provided.

24 Claims, 9 Drawing Sheets

(a)　　　　　　　(b)　　　　　　　(c)

(a)     (b)     (c)

(a) h1[x]    (b) h2[x]

(a)

(b)

(c)

METHOD FOR ADJUSTING DISPARITY IN THREE-DIMENSIONAL IMAGE AND THREE-DIMENSIONAL IMAGING DEVICE THEREOF

CROSS-REFERENCE TO RELATED APPLICATIONS

This application claims priority from Korean Patent Application No. 10-2006-0112298, filed on Nov. 14, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to adjusting disparity in a three-dimensional image and a three-dimensional imaging device, and more particularly, to adjusting disparity in a three-dimensional image and a three-dimensional imaging device in which disparity in a three-dimensional image is adjusted in order to reduce visual fatigue occurring when viewing the three-dimensional image.

2. Description of the Related Art

Three-dimensional (3D) cameras, such as stereo cameras or multi-view cameras, generally capture left and right images using two or more cameras functioning similarly to human eyes, and cause a viewer to feel a stereoscopic effect due to disparities between the two images. Specifically, a user observes parallax due to the disparity between the two images captured by a 3D camera, and this binocular parallax causes the user to experience a stereoscopic effect.

FIG. 1 is a view illustrating various types of binocular parallax. In FIG. 1, when a user views a 3D image, the binocular parallax which the user sees can be divided into (a) negative parallax, (b) positive parallax, and (c) zero parallax. (a) Negative parallax means objects appear to project from a screen, and (b) positive parallax means objects appear to be behind the screen. (c) Zero parallax refers to the situation where objects appear to be on the same horizontal plane as the screen.

In 3D images, negative parallax generally has a greater stereoscopic effect than positive parallax, but has a greater convergence angle than positive parallax, so viewing positive parallax is more comforting to the human eyes. However, if objects in 3D images have only positive parallax, eyes feel fatigue even though eyes feel comfortable in the positive parallax. In the same manner, if objects in 3D images have only negative parallax, both eyes feel fatigue.

FIG. 2 is a view illustrating various types of 3D cameras in the related art. In FIG. 2, the 3D camera comprises (a) parallel 3D camera 210, (b) toe-in 3D camera 220, and (c) hybrid 3D camera 230.

The parallel 3D camera 210 having both lenses placed in parallel has an advantage in image compression/transmission and image processing, but is unable to converge on a single point like the eyes of the human. The toe-in 3D camera 220 has a convergence functionality, but vertical parallax is generated at the left and right edges of the 3D image. The distortion of the 3D image due to the vertical parallax causes visual fatigue. In the hybrid 3D camera 230, lenses and charge coupled devices (CCDs) move separately, and the convergence functionality is controlled without the vertical parallax, and thus it is possible to embody a 3D image with less visual fatigue.

However, it is difficult for the multi-view camera and other 3D cameras to be implemented in the same manner as the hybrid 3D camera 230.

Therefore, there is a need for methods to display 3D images captured by a multi-view camera and other 3D cameras, such as 3D images captured by the hybrid 3D camera 230.

SUMMARY OF THE INVENTION

Exemplary embodiments of the present invention may overcome the above disadvantages and other disadvantages not described above. Also, the present invention is not required to overcome the disadvantages described above, and an exemplary embodiment of the present invention may not overcome any of the problems described above.

The present invention provides a method for adjusting disparity in a 3D image and a 3D imaging device thereof in order to provide an optimum 3D image giving excellent stability and less visual fatigue.

The present invention also provides a method for adjusting disparity in a 3D image and a 3D imaging device thereof in order to embody a 3D image captured by a parallel camera or a multi-view camera, such as a 3D image captured by a hybrid 3D camera.

According to an aspect of the present invention, there is provided a method for adjusting disparity in a 3D image, the method comprising estimating disparity in an input 3D image and computing a disparity histogram pixel-wise; analyzing energy of a predetermined parallax range of the disparity histogram and determining a disparity adjustment amount; and reproducing the 3D image based on the disparity adjustment amount.

The computing the disparity adjustment amount may comprise determining as the disparity adjustment amount a shift distance corresponding to a highest energy in the predetermined parallax range of the disparity histogram.

The predetermined parallax range may be a range within ±7° of a fusion limit.

The shift distance of the disparity histogram corresponding to a range of ±1° may be determined to be the disparity adjustment amount, if i) the predetermined parallax range is ±1° or ±2° in a binocular parallax range, and ii) an absolute value of a first shift distance minus a second shift distance is less than or equal to a threshold value, wherein the first shift distance corresponds to the maximum sum of convolution in a convolution mask and a disparity histogram corresponding to the binocular parallax range being ±1° and the second shift distance corresponds to a maximum sum of convolution in a convolution mask and a disparity histogram corresponding to the binocular parallax range being ±2°.

Alternatively, the first shift distance range of ±1° may be determined to be the disparity adjustment amount, if i) the absolute value of the first shift distance minus the second shift distance exceeds a threshold, and ii) a sum of a disparity in a field excluding a field corresponding to the binocular parallax range of ±2°, for the disparity histogram shifted by the first distance, is less than a sum of a disparity in a field, excluding a field corresponding to the binocular parallax range of ±2°, for the disparity histogram shifted by the second distance.

The second shift distance corresponding to the binocular parallax range of ±2° may be determined to be the disparity adjustment amount, if i) the absolute value of the first shift distance minus the second shift distance, exceeds a threshold, and ii) a sum of a disparity in a field excluding a field corresponding to the binocular parallax range of ±2°, for the disparity histogram shifted by the first shift distance, is greater than a sum of a disparity in a field, excluding a field corresponding to the range of ±2°, for the disparity histogram shifted by the second distance.

The predetermined parallax range and the threshold may be determined based on experimental data.

The reproducing the 3D image may comprise cropping a left portion of a left image of the input 3D image by as much as half of the disparity adjustment amount; cropping a right portion of a left image of the input 3D image by as much as half of the disparity adjustment amount; and combining the cropped left image and the cropped right image.

The method may further comprise applying a moving average (MA) filter to the reproduced 3D image to eliminate jitter.

The computing the disparity histogram may comprise converting binocular parallax which occurs due to a difference between an adjustment angle and convergence angles into pixel-wise disparity.

The energy of the parallax range of the disparity histogram may be determined using a sum of convolution in the disparity histogram and a convolution mask having a predetermined parallax range.

The convolution mask may be at least one of a discrete convolution mask, a triangular convolution mask, a 1D convolution mask, a 2D convolution mask, and a cubic convolution mask.

According to another aspect of the prevent invention, there is provided a 3D imaging device comprising a disparity estimator which estimates disparity in an input 3D image and computes a disparity histogram pixel-wise; a disparity adjustor which analyzes energy of a predetermined parallax range of the disparity histogram and determines a disparity adjustment amount; and a 3D image reproducer which reproduces the 3D image based on the disparity adjustment amount.

The disparity adjustor may determine as the disparity adjustment amount a shift distance corresponding to a highest energy in the predetermined parallax range of the disparity histogram.

The predetermined parallax range may be a range within ±7° of a fusion limit.

The disparity adjustor may determine the first shift distance of the disparity histogram corresponding to a range of ±1° to be the disparity adjustment amount, if i) the predetermined parallax range is ±1° or ±2° in a binocular parallax, and ii) an absolute value of a first shift distance minus a second shift distance is less than or equal to a threshold value, wherein the first shift distance corresponds to a maximum sum of convolution in a convolution mask and a disparity histogram corresponding to the binocular parallax range being ±1° and the second shift distance corresponds to a maximum sum of convolution in a convolution mask and a disparity histogram corresponding to the binocular parallax being ±2°.

Alternatively, the disparity adjustor may determine a shift distance corresponding to a binocular parallax range of ±1° to be the disparity adjustment amount, if i) an absolute value of a first shift distance corresponding to the maximum sum of convolution in a convolution mask and a disparity histogram corresponding to the binocular parallax range being ±1° minus a second shift distance corresponding to the maximum sum of convolution in a convolution mask and a disparity histogram corresponding to the binocular parallax range being ±2°, exceeds a threshold, and ii) a sum of a disparity in a field excluding a field corresponding to the binocular parallax range of ±2°, for the disparity histogram shifted by the first distance, is less than a sum of a disparity in a field excluding a field corresponding to the binocular parallax range of ±2°, for the disparity histogram shifted by the second distance.

The disparity adjustor may determine a shift distance corresponding to a binocular parallax range of ±2° to be the disparity adjustment amount, if i) an absolute value of a first shift distance corresponding to the maximum sum of convolution in a convolution mask and a disparity histogram corresponding to the binocular parallax being ±1° minus a second shift distance corresponding to the maximum sum of convolution in a convolution mask and a disparity histogram corresponding to the binocular parallax being ±2°, exceeds a threshold, and ii) a sum of a disparity in a field, excluding a field corresponding to the range of ±2°, for the disparity histogram shifted by the first distance, is greater than a sum of a disparity in a field excluding a field corresponding to the binocular parallax range of ±2°, for the disparity histogram shifted by the second distance.

The predetermined parallax range and the threshold may be determined based on experimental data.

The 3D image reproducer may crop a left portion of a left image of the input 3D image by as much as half of the disparity adjustment amount, crop a right portion of a right image of the input 3D image by as much as half of the disparity adjustment amount, and combine the cropped left image and the cropped right image.

The device may further comprise a jitter eliminator which applies a moving average (MA) filter to the reproduced 3D image to eliminate jitter.

The disparity estimator may convert binocular parallax which occurs due to a difference between an adjustment angle and convergence angles into pixel-wise disparity.

The energy of the predetermined parallax range of the disparity histogram may be computed using a sum of convolution in the disparity histogram and a convolution mask having a predetermined parallax range.

The convolution mask may be at least one of a discrete convolution mask, a triangular convolution mask, a 1D convolution mask, a 2D convolution mask, and a cubic convolution mask.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
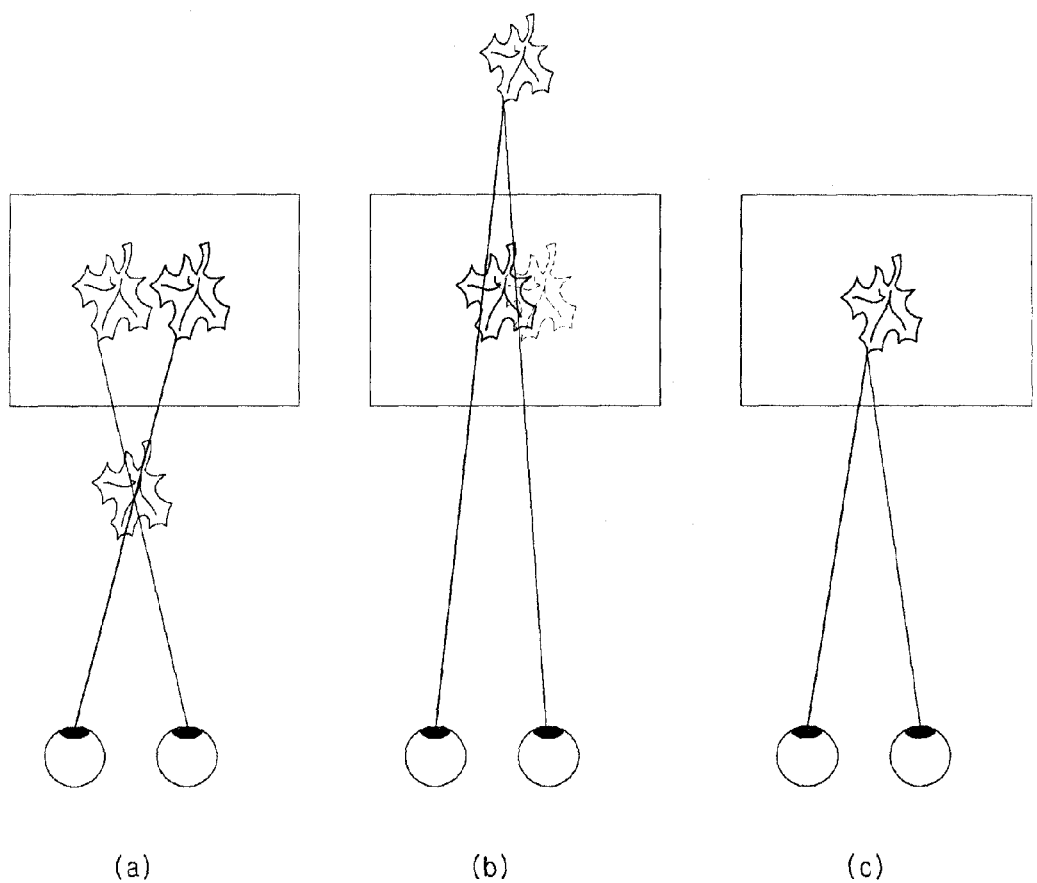
FIG. 1 is a view illustrating various types of general binocular parallax in the related art.
Figure 2:
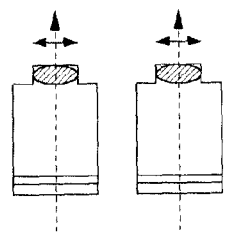
FIG. 2 is a view illustrating various types of 3D cameras in the related art.
Figure 2:
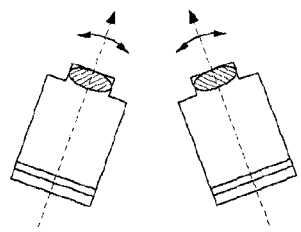
Figure 2:
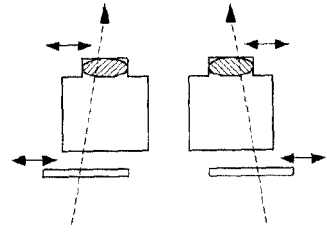
Figure 2:
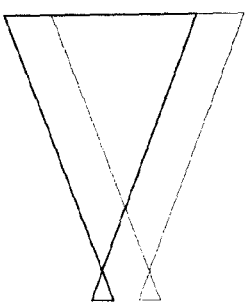
Figure 2:
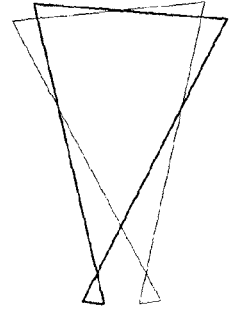
Figure 2:
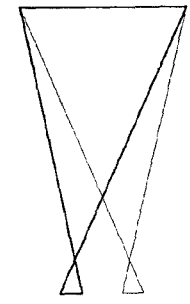

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

Figure 3:
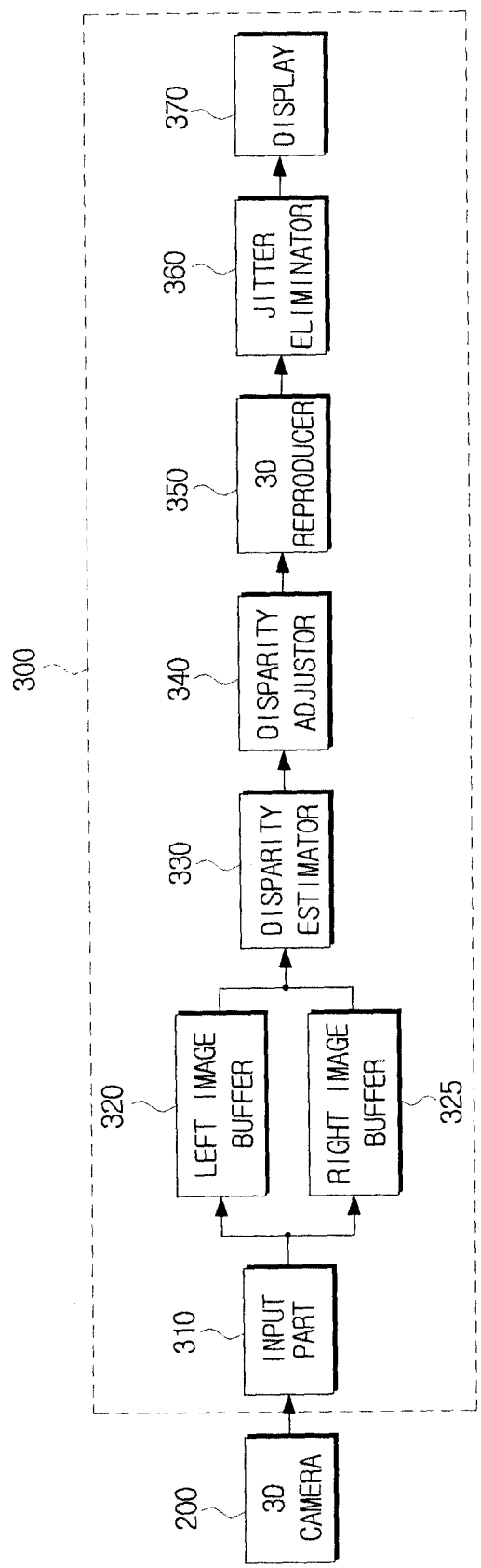
FIG. 3 is a block diagram of a 3D camera system using a 3D imaging device according to an exemplary embodiment of the present invention.

FIG. 3 is a block diagram of a three-dimensional camera system using a three-dimensional imaging device according to an exemplary embodiment of the present invention.

A 3D imaging device 300 according to an exemplary embodiment of the present invention generates an optimum 3D image without causing visual fatigue. In order to obtain the optimum 3D image, the 3D imaging device 300 analyzes a disparity histogram of the 3D image based on "3D Safety/Guideline" provided by the 3D consortium, and adjusts the disparity.

Referring to FIG. 3, the 3D camera system comprises a 3D camera 200 and the 3D imaging device 300. The 3D camera 200 may be a parallel camera or a multi-view camera, and a 3D image captured by the 3D camera 200 is sent to the 3D imaging device 300.

The 3D imaging device 300 comprises an input part 310, a left image buffer 320, a right image buffer 325, a disparity estimator 330, a disparity adjustor 340, a 3D reproducer 350, a jitter eliminator 360, and a display 370.

The input part 310 receives the 3D image from the 3D camera 200, and separates the image into a left image and a right image. If the 3D image input through the input part 310 is a multi-view image, two images may be optionally selected from among the multi-view image. The left image separated by the input part 310 is temporarily stored in the left image buffer 320, and the right image separated by the input part 310 is temporarily stored in the right image buffer 325. The disparity estimator 330 estimates variation in the position of objects that appear in the left and right images respectively. The disparity estimator 330 fragments the left image into N×N blocks, and then estimates variation in the position of objects for each block to find a block which is the most similar to blocks in the right image. Additionally, the disparity estimator 330 estimates a disparity vector representing the distance between the reference block of the right image and the estimated block, and estimates a disparity vector of pixels in each block.

Figure 4:
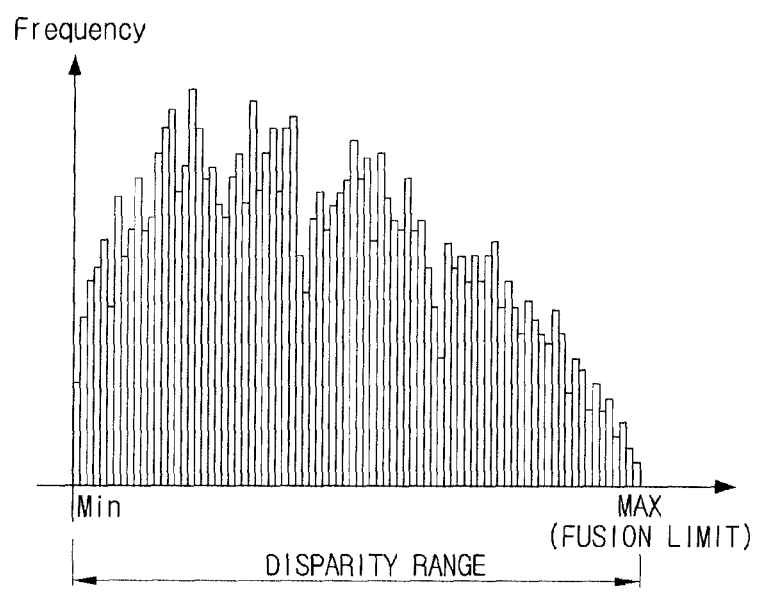
FIG. 4 is a view illustrating a disparity histogram computed by disparity estimation according to an exemplary embodiment of the present invention.

The disparity estimator 330 obtains a histogram of a horizontal component of the disparity vector for each pixel. This is because the distribution of parallax of objects in the 3D image is analyzed by the disparity histogram and a stereoscopic effect is more closely associated with a horizontal parallax than a vertical parallax. The disparity histogram obtained by the disparity estimator 330 is shown in FIG. 4.

The disparity adjustor 340 computes a disparity range from the disparity histogram obtained by the disparity estimator 330, based on the "3D Safety/Guideline". Specifically, the "3D Safety/Guideline" discourages users from displaying images which exceed the fusion limit of their eyes and adjusts the depth of the object in order to obtain an optimum 3D image. Additionally, the "3D Safety/Guideline" provides a suitable binocular parallax, that is, a binocular parallax within 7° of the fusion limit of one's eyes, viz., the maximum fusion range. If the binocular parallax is less than 2°, the user may experience comfort, and if the binocular parallax is 1° or less, the user may experience greater comfort.

The disparity adjustor 340 convolutes the disparity histogram by applying a convolution mask corresponding to a binocular parallax ranging between ±1° and ±2°, and analyzes energy of the disparity histogram within each mask range. The disparity adjustor 340 adjusts the disparity so that the optimum 3D image can be displayed using the energy analysis of the disparity histogram.

The 3D reproducer 350 crops an amount less than or equal to the amount of the disparity adjusted by the disparity adjustor 340 off the edge of the 3D image to reproduce the 3D image. The jitter eliminator 360 eliminates jitter occurring because of the variation in the disparity adjustment amount for every frame by using a moving average (MA) filter based on the disparity adjustment amount of the 3D image. The reproduced 3D image is displayed on the display 370.

A 3D camera system comprising the 3D camera 200 and 3D device 300 separately was illustrated and described above, but the 3D camera 200 and 3D imaging device 300 may also be combined in a single apparatus. In other words, it is possible to adjust the disparity of the captured 3D image and reproduce the 3D image in a single apparatus, which may not comprise the input part 310.

The 3D imaging device 300 comprising the display 370 was illustrated and described in the exemplary embodiment of the present invention, but the reproduced 3D image may be displayed on an external display apparatus.

Figure 5:
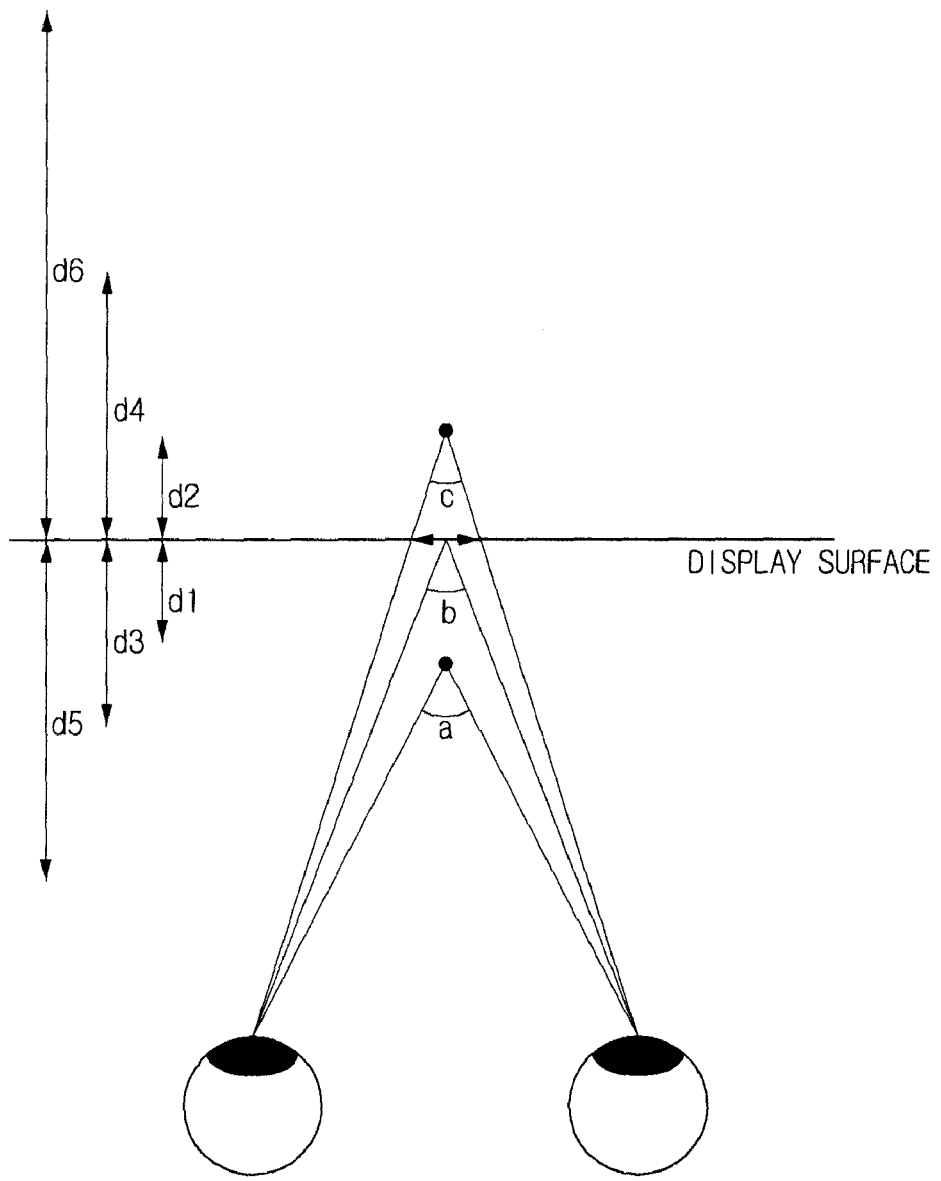
FIG. 5 is a view illustrating a method for computing the range of perceived depth based on binocular parallax according to an exemplary embodiment of the present invention.

FIG. 5 is a view illustrating a method for computing a visual depth range based on the binocular parallax according to an exemplary embodiment of the present invention.

In FIG. 5, the binocular parallax is obtained from the difference between an adjustment angle b and convergence angles a and c of the eye lens. If a viewing distance is provided, the range of the depth may be obtained as 1°, 2° and 7° in the binocular parallax using the second cosine law.

Accordingly, if the binocular parallax angle is ±1°, the depth ranges between d1 and d2, if the binocular parallax angle is ±2°, the depth ranges between d3 and d4, and if the binocular parallax angle is ±7°, the depth ranges between d5 and d6.

If a depth ranging between d1 and d2 is divided by pixel pitches, the range of the disparity corresponding to ±1° in the binocular parallax, that is, a depth ranging between d1 and d2, may be obtained pixel-wise. In the same manner, a disparity range corresponding to a depth ranging between d3 and d4 and a depth ranging between d5 and d6 may be obtained.

Figure 6A:
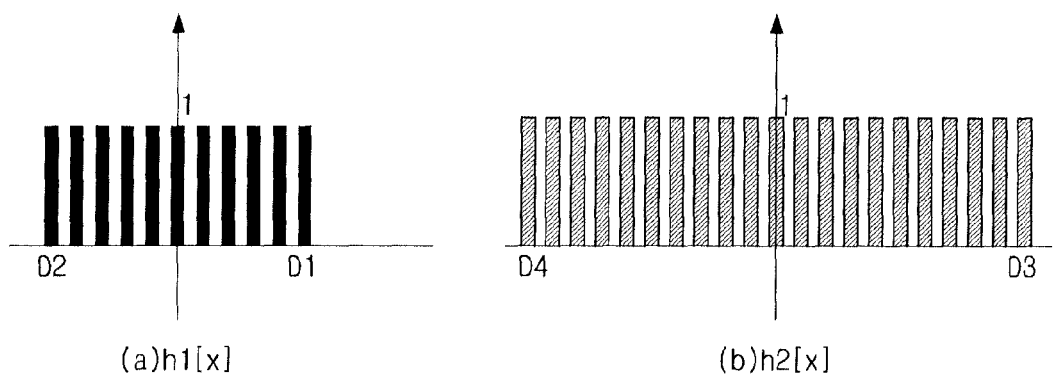
FIG. 6A is a view illustrating convolution masks according to an exemplary embodiment of the present invention.

FIG. 6A is a view illustrating convolution masks according to an exemplary embodiment of the present invention.

In FIG. 6A, (a) h1[x] indicates a convolution mask corresponding to a binocular parallax with a range of ±1°, and (b) h2[x] indicates a convolution mask corresponding to a binocular parallax with a range of ±2°. Accordingly, (a) h1[x] corresponds to a depth ranging between d1 and d2, and (b) h2[x] corresponds to a depth ranging between d3 and d4.

Figure 6B:
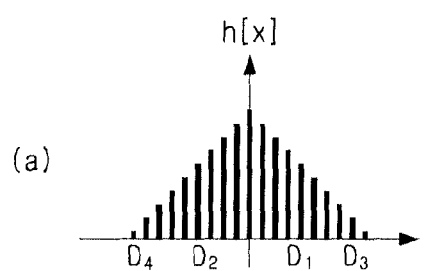
FIG. 6B is a view illustrating convolution masks according to another exemplary embodiment of the present invention.
Figure 6B:
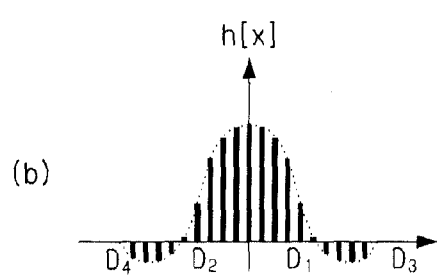
Figure 6B:
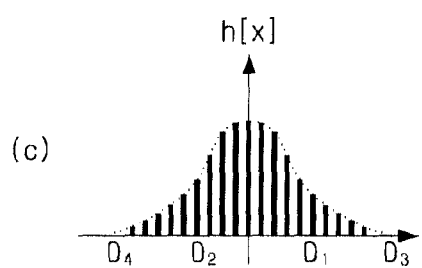

The mask for a general discrete convolution was illustrated above in FIG. 6A as an exemplary embodiment of the present invention, but FIG. 6B is a view illustrating convolution masks according to another exemplary embodiment of the present invention.

As shown in FIG. 6B, (a) triangular convolution mask, (b) cubic convolution mask, and (c) 2D convolution mask may be used. Additionally, a linear convolution mask (not shown) or other convolution masks having different shapes may be employed.

If a discrete convolution mask is used, the disparity is controlled on a background portion which occupies the greater part of the 3D image. Accordingly, if a user wishes to adjust the disparity on a foreground portion or object, a convolution mask in the positive direction is used.

Figure 7:
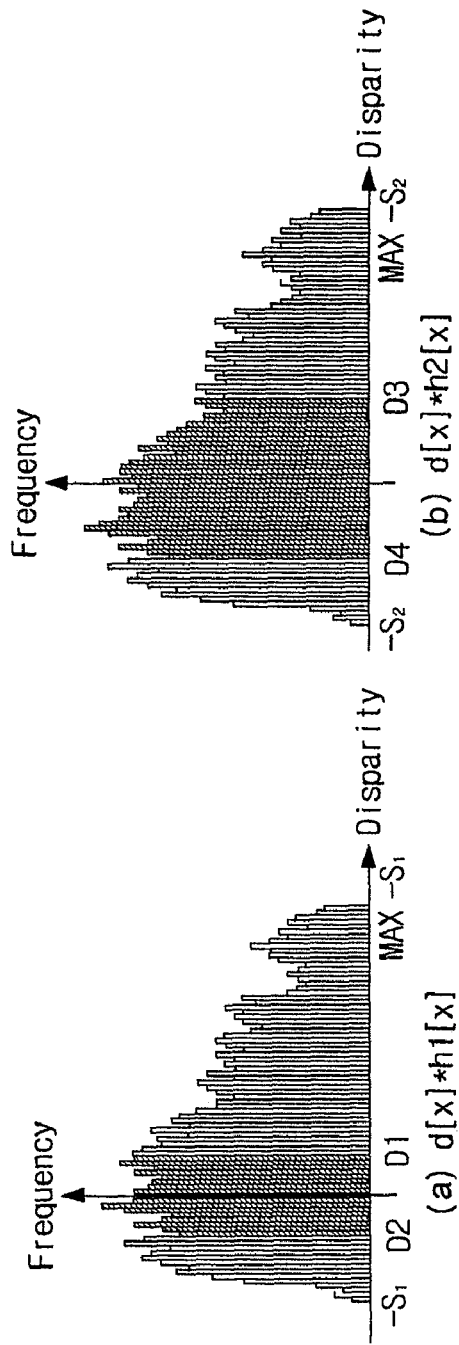
FIG. 7 is a view explaining the energy analysis of the disparity histogram applying the convolution mask of FIG. 6A.

FIG. 7 is a view explaining the energy analysis of the disparity histogram applying the convolution mask of FIG. 6A.

FIG. 7 shows disparity histogram representations of the convolution masking operation of FIG. 6A. Specifically, (a) shows a histogram representation of the convolution operation of the disparity histogram shown in FIG. 4 using the convolution mask (a) h1[x] corresponding to ±1° in the binocular parallax of FIG. 6A, and (b) shows a histogram representation of the convolution operation of the disparity histogram shown in FIG. 4 using the convolution mask (b) h2[x] corresponding to ±2° in the binocular parallax of FIG. 6A. In FIG. 7, D1 to D2 indicates a disparity range in the depth ranging between d1 and d2, and D3 to D4 indicates a disparity range in the depth ranging between d3 and d4.

A sum of convolution for each convolution mask range in the disparity histogram is computed using the following Equation 1:

$$S_a = d*h_1 = \sum_{S1=0}^{MAX} h1[x]d[s1-x] = \sum_{D2}^{D1} d[x+s1],$$

$$s1 = 0, 1, 2, \ldots, MAX$$

$$S_b = d*h_2 = \sum_{s2=0}^{MAX} h2[x]d[s2-x] = \sum_{D4}^{D3} d[x+s2],$$

$$s2 = 0, 1, 2, \ldots, MAX$$

Equation 1 where, $S_a$ represents a sum of convolution when d[x] is shifted to the left, i.e., in the negative direction, s1, by a shift distance and $S_b$ represents a sum of convolution when d[x] is shifted to the left, i.e., in the negative direction, up to the shift distance s2.

Referring to FIG. 7 and Equation 1, distribution of disparity components of the 3D image is the greatest in each convolution mask range. In other words, disparity energy is the highest in each convolution mask range. Accordingly, in order to obtain the most suitable 3D image having a good stability and a stereoscopic effect, the disparity histogram is shifted by shift distance s1 or s2.

As described above, the sum of convolution is used in order to compute the disparity energy, but this is only an exemplary embodiment. Accordingly, an integral of a disparity histogram in the specific range may be used, or all methods for computing energy may be employed.

Figure 8:
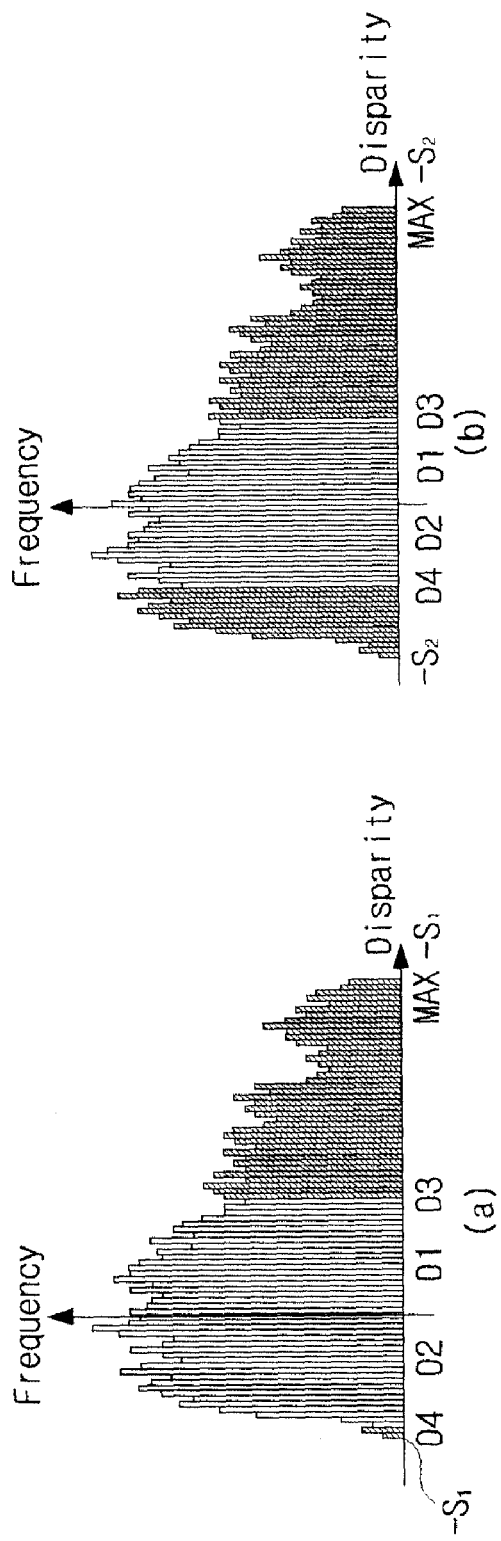
FIG. 8 a view explaining a method for determining a disparity adjustment amount using the energy analysis of the disparity histogram of FIG. 7.

FIG. 8 is a view explaining a method for determining a disparity adjustment amount using the energy analysis of the disparity histogram of FIG. 7.

In FIG. 8, (a) represents the sum of the disparity in a field excluding the field [D4, D3] when d[x] is shifted in the negative direction by shift distance s1, and (b) represents the sum of the disparity in a field excluding the field [D4, D3] when d[x] is shifted in the negative direction by shift distance s2.

The sum of the disparity in a field excluding the field [D4, D3] is computed by the following Equation 2:

$$D_{s1} = \sum_{-s1}^{MAX-s1} d[x+s1] - \sum_{D4}^{D3} d[x+s1]$$

$$D_{s2} = \sum_{-s2}^{MAS-s2} d[x+s2] - \sum_{D4}^{D3} d[x+s2]$$

Equation 2 wherein, $D_{s1}$ represents a sum of a disparity in a field excluding the field [D4, D3] when d[x] is shifted in the negative direction by shift distance s1, and $D_{s2}$ represents a sum of a disparity in a field excluding the field [D4, D3] when d[x] is shifted in the negative direction by shift distance s2.

The disparity adjustment amount is determined by the following Equation 3:

$$D_{sh}=s1, \text{ if}|s1-s2|\leq Th$$

$$D_{sh}=s1, \text{ if}|s1-s2|>Th, D_{s1}<D_{s2}$$

$$D_{sh}=s2, \text{ if}|s1-s2|>Th, D_{s1}>D_{s2}$$

Equation 3 where, if an absolute value of a shift distance s1 minus a shift distance s2 is less than or equal to a threshold Th, s1 is selected as a disparity adjustment amount; if an absolute value of a shift distance s1 minus a shift distance s2 exceeds the threshold Th, a shift distance corresponding to a smaller of $D_{s1}$ and $D_{s2}$ is selected. In other words, the smaller shift distance of a disparity field excluding the field [D4, D3] is selected as a disparity adjustment amount. The threshold is determined based on experimental data.

For example, referring to FIG. 8, the sum of disparity $D_{s1}$ of (a) is less than the sum of disparity $D_{s2}$ of (b), and thus, s1 is selected as a disparity adjustment amount.

Figure 9:
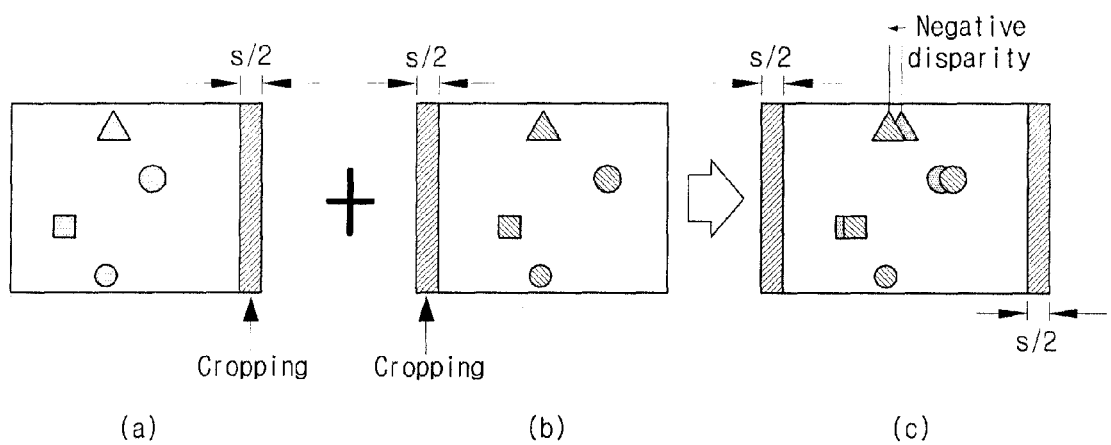
FIG. 9 is a view explaining a method for reproducing a 3D image according to the disparity adjustment amount of FIG. 8.

FIG. 9 is a view explaining a method for reproducing a 3D image according to the disparity adjustment amount of FIG. 8.

In FIG. 9, a right image (a) and a left image (b) are combined to produce a 3D image (c). According to the selected adjustment amount, the right edge of the right image (a) is cropped by as much as half of the selected adjustment amount. Additionally, the left edge of the left image (b) is cropped by as much as half of the selected adjustment amount. Next, the right image of (a) and the left image of (b) are combined to reproduce a 3D image.

Therefore, the disparity amount in the entire 3D image is reduced, and thus a viewer may experience greater viewing comfort, and the most suitable stereoscopic effect may be provided.

Figure 10:
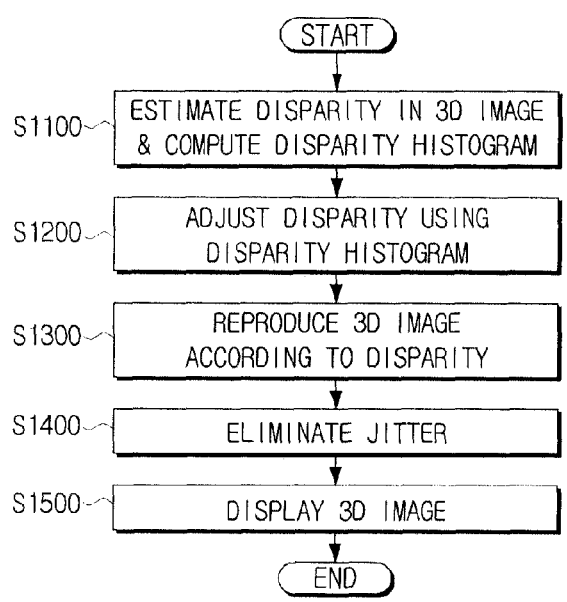
FIG. 10 is a flowchart explaining a method for adjusting disparity in a 3D image of a 3D imaging device according to an exemplary embodiment of the present invention.

FIG. 10 is a flowchart explaining a method for adjusting disparity in a 3D image of a 3D imaging device according to an exemplary embodiment of the present invention.

In FIG. 10, the disparity estimator 330 estimates disparity in a 3D image and computes a disparity histogram (S1100). As the method for estimating the disparity and computing the disparity histogram was described with reference to FIGS. 3 and 4, detailed description thereof is omitted.

The disparity adjustor 340 adjusts the disparity using the disparity histogram (S1200). As the method for adjusting the disparity was described with reference to FIGS. 5 to 8, detailed description thereof is omitted.

The 3D image reproducer 350 reproduces a 3D image according to the adjusted disparity (S1300). As the method for reproducing the 3D image was described with reference to FIG. 9, detailed description thereof is omitted.

The jitter eliminator 360 removes jitter of the reproduced 3D image (S1400). Specifically, the jitter eliminator 360 applies a window based on the disparity adjustment amount of the 3D image which is sequentially input, and performs filtering. Additionally, the jitter eliminator 360 applies the filtered disparity adjustment amount to the reproduced 3D image, to prevent jitter.

The reproduced 3D image is displayed on the display 370 (S1500).

The above description was provided by taking into consideration two disparity ranges based on the "3D Safety/Guideline" as an exemplary embodiment of the present invention, but may be limited to a single disparity range. In other words, if d[x] is shifted in the negative direction by shift distance s1, a shift distance corresponding to the maximum disparity energy may be set as a disparity adjustment amount.

The disparity adjustment amount was determined by analyzing the disparity energy in two disparity ranges based on the "3D Safety/Guideline", that is, the quite comfortable binocular parallax in the range of ±1° and the comfortable binocular parallax in the range of ±2°, but this is only an exemplary embodiment of the present invention. Accordingly, it is possible to analyze disparity energy in any range within the range of ±1° and the range of ±2°, and also to analyze disparity energy in any range within ±7° of the fusion limit. Since users may individually prefer different degrees of binocular parallax in order to feel an optimal stereoscopic effect, it is possible to analyze the disparity energy in the range of the binocular parallax obtained by the experiment which is concerned with the binocular parallax capable of making a user feel an optimal stereoscopic effect within ±7° of the fusion limit.

As described above, according to the exemplary embodiments of the present invention, the disparity energy of the disparity histogram is analyzed and the disparity adjustment amount is computed. Therefore, visual fatigue occurring due to excessive disparity may be reduced, so a viewer may experience comfort, and an optimal stereoscopic effect may be provided.

Additionally, according to the exemplary embodiments of the present invention, the 3D image captured by the parallel camera or the multi-view camera may be embodied as the 3D image captured by the hybrid 3D camera.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for adjusting disparity in a 3D image, the method comprising:
   estimating disparity in an input 3D image and computing a disparity histogram pixel-wise;
   analyzing energy of a parallax range of the disparity histogram and determining a disparity adjustment amount; and
   reproducing the 3D image based on the disparity adjustment amount.

2. The method as claimed in claim 1, wherein the determining the disparity adjustment amount comprises determining as the disparity adjustment amount a shift distance corresponding to a highest energy in the parallax range of the disparity histogram.

3. The method as claimed in claim 2, wherein the parallax range is a range within ±7° of a fusion limit.

4. The method as claimed in claim 2, wherein the shift distance is a first shift distance, and the shift distance of the disparity histogram corresponding to a range of ±1° is determined to be the disparity adjustment amount,
   if the parallax range is ±1° or ±2° in a binocular parallax range, and if an absolute value of the first shift distance minus a second shift distance is less than or equal to a threshold value,
   wherein the first shift distance corresponds to a maximum sum of convolution in a convolution mask and a disparity histogram corresponding to the binocular parallax range being ±1° and the second shift distance corresponds to a maximum sum of convolution in a convolution mask and a disparity histogram corresponding to the binocular parallax range being ±2°.

5. The method as claimed in claim 4, wherein the first shift distance corresponding to the binocular parallax range of ±1° is determined to be the disparity adjustment amount,
   if the absolute value of the first shift distance minus the second shift distance exceeds a threshold, and if a sum of a disparity in a field excluding a field corresponding to the binocular parallax range of ±2°, for the disparity histogram shifted by the first distance, is less than a sum of a disparity in a field excluding a field corresponding to the binocular parallax range of ±2° for the disparity histogram shifted by the second distance.

6. The method as claimed in claim 4, wherein the second shift distance corresponding to the binocular parallax range of ±2° is determined to be the disparity adjustment amount,
   if the absolute value of the first shift distance minus the second shift distance, exceeds a threshold, and if a sum of a disparity in a field excluding a field corresponding to the range of ±2°, for the disparity histogram shifted by the first shift distance is greater than a sum of a disparity in a field, excluding a field corresponding to the range of ±2°, for the disparity histogram shifted by the second distance.

7. The method as claimed in claim 4, wherein the parallax range and the threshold are determined based on experimental data.

8. The method as claimed in claim 1, wherein the reproducing the 3D image comprises:
   cropping a left portion of a left image of the input 3D image by as much as half of the disparity adjustment amount;
   cropping a right portion of a right image of the input 3D image by as much as half of the disparity adjustment amount; and
   combining the cropped left image and the cropped right image.

9. The method as claimed in claim 1, further comprising applying a moving average (MA) filter to the reproduced 3D image to eliminate jitter.

10. The method as claimed in claim 1, wherein the computing the disparity histogram comprises converting binocular parallax which occurs due to a difference between an adjustment angle and convergence angles into pixel-wise disparity.

11. The method as claimed in claim 1, wherein the energy of the parallax range of the disparity histogram is determined using a sum of convolution in the disparity histogram and a convolution mask having a predetermined parallax range.

12. The method as claimed in claim 11, wherein the convolution mask is at least one of a discrete convolution mask, a triangular convolution mask, a 1D convolution mask, a 2D convolution mask, and a cubic convolution mask.

13. A 3D imaging device comprising:
  a disparity estimator which estimates disparity in an input 3D image and computes a disparity histogram pixel-wise;
  a disparity adjustor which analyzes energy of a parallax range of the disparity histogram and determines a disparity adjustment amount; and
  a 3D image reproducer which reproduces the 3D image based on the disparity adjustment amount.

14. The device as claimed in claim 13, wherein the disparity adjustor determines as the disparity adjustment amount a shift distance corresponding to a highest energy in the parallax range of the disparity histogram.

15. The device as claimed in claim 13, wherein the parallax range is a range within ±7° of a fusion limit.

16. The device as claimed in claim 14, wherein the shift distance is a first shift distance, and the disparity adjustor determines the first shift distance of the disparity histogram corresponding to a range of ±1° to be the disparity adjustment amount,
  if the parallax range is ±1° or ±2° in a binocular parallax range, and if an absolute value of the first shift distance minus a second shift distance is less than or equal to a threshold value,
  wherein the first shift distance corresponds to a maximum sum of convolution in a convolution mask and a disparity histogram corresponding to the binocular parallax range being ±1° and the second shift distance corresponds to a maximum sum of convolution in a convolution mask and a disparity histogram corresponding to the binocular parallax range being ±2°.

17. The device as claimed in claim 14, wherein the disparity adjustor determines a shift distance corresponding to a binocular parallax range of ±1° to be the disparity adjustment amount,
  if an absolute value of a first shift distance corresponding to the maximum sum of convolution in a convolution mask and a disparity histogram corresponding to the binocular parallax range being ±1° minus a second shift distance corresponding to the maximum sum of convolution in a convolution mask and a disparity histogram corresponding to the binocular parallax range being ±2°, exceeds a threshold, and if a sum of a disparity in a field, excluding the field corresponding to the binocular parallax range of ±2°, for the disparity histogram shifted by the first distance, is less than a sum of a disparity in a field excluding a field corresponding to the binocular parallax range of ±2°, for the disparity histogram shifted by the second distance.

18. The device as claimed in claim 14, wherein the disparity adjustor determines a shift distance corresponding to a binocular parallax range of ±2° to be the disparity adjustment amount,
  if an absolute value of a first shift distance corresponding to the maximum sum of convolution in a convolution mask and a disparity histogram corresponding to the binocular parallax range being ±1° minus a second shift distance corresponding to the maximum sum of convolution in a convolution mask and a disparity histogram corresponding to the binocular parallax range being ±2°, exceeds a threshold, and if a sum of a disparity in a field excluding a field corresponding to the binocular parallax range of ±2°, for the disparity histogram shifted by the first shift distance, is greater than a sum of a disparity in a field excluding a field corresponding to the binocular parallax range of ±2°, for the disparity histogram shifted by the second distance.

19. The device as claimed in claim 16, wherein the parallax range and the threshold are determined based on experimental data.

20. The device as claimed in claim 13, wherein the 3D image reproducer crops a left portion of a left image of the input 3D image by as much as half of the disparity adjustment amount, crops a right portion of a right image of the input 3D image by as much as half of the disparity adjustment amount, and combines the cropped left image and the cropped right image.

21. The device as claimed in claim 13, further comprising a jitter eliminator which applies a moving average (MA) filter to the reproduced 3D image to eliminate jitter.

22. The method as claimed in claim 13, wherein the disparity estimator converts binocular parallax which occurs due to a difference between an adjustment angle and convergence angles into pixel-wise disparity.

23. The method as claimed in claim 13, wherein the energy of the parallax range of the disparity histogram is computed using a sum of convolution in the disparity histogram and a convolution mask having a predetermined parallax range.

24. The method as claimed in claim 23, wherein the convolution mask is at least one of a discrete convolution mask, a triangular convolution mask, a 1D convolution mask, a 2D convolution mask, and a cubic convolution mask.

* * * * *